US009344631B2

(12) United States Patent
Penev et al.

(10) Patent No.: US 9,344,631 B2
(45) Date of Patent: May 17, 2016

(54) METHOD, SYSTEM AND APPARATUS FOR SELECTING AN IMAGE CAPTURED ON AN IMAGE CAPTURE DEVICE

(71) Applicant: CANON KABUSHIKI KAISHA, Tokyo (JP)

(72) Inventors: Alex Penev, New South Wales (AU); Mark Ronald Tainsh, New South Wales (AU)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/708,398

(22) Filed: Dec. 7, 2012

(65) Prior Publication Data
US 2013/0148003 A1   Jun. 13, 2013

(30) Foreign Application Priority Data

Dec. 12, 2011   (AU) .............................. 2011253977

(51) Int. Cl.
*H04N 5/222* (2006.01)
*H04N 5/232* (2006.01)
*H04N 1/00* (2006.01)
*H04N 101/00* (2006.01)

(52) U.S. Cl.
CPC ......... *H04N 5/23293* (2013.01); *H04N 1/0044* (2013.01); *H04N 5/23206* (2013.01); *H04N 2101/00* (2013.01)

(58) Field of Classification Search
USPC .............. 348/333.11, 231.2, 207.11; 382/100
See application file for complete search history.

(56) References Cited

U.S. PATENT DOCUMENTS

| 5,164,992 | A | 11/1992 | Turk et al. |
| 6,184,926 | B1 | 2/2001 | Khosravi et al. |
| 7,620,720 | B1 | 11/2009 | Gasser |
| 7,711,145 | B2 | 5/2010 | Gallagher |
| 2004/0126038 | A1 | 7/2004 | Aublant |
| 2005/0096084 | A1* | 5/2005 | Pohja et al. ................. 455/556.1 |
| 2008/0317298 | A1* | 12/2008 | Shah et al. .................... 382/118 |
| 2010/0086204 | A1 | 4/2010 | Lessing |
| 2010/0287053 | A1 | 11/2010 | Ganong et al. |
| 2010/0328492 | A1* | 12/2010 | Fedorovskaya et al. ... 348/231.2 |

(Continued)

FOREIGN PATENT DOCUMENTS

| CN | 101918989 A | 12/2010 |
| JP | 2007181070 A | 7/2007 |

(Continued)

OTHER PUBLICATIONS

"Making Photo Tagging Easier"; Justin Mitchell; Jun. 30, 2011.
"Some Results on Multicategory Patter Recognition"; Bledsoe, Panoramic Research, Inc., Palo Alto, California; p. 304-316.

*Primary Examiner* — Roberto Velez
*Assistant Examiner* — Stephen Coleman
(74) *Attorney, Agent, or Firm* — Canon U.S.A., Inc. IP Division

(57) ABSTRACT

A method of selecting an image captured on an image capture device (101) is disclosed. A captured image is displayed on a display (114) associated with the image capture device (101). A viewer image of a viewer viewing the captured image displayed on the display (114) is captured using the image capture device (101). The captured image and the viewer image are compared to identify at least one common feature in the captured image and the viewer image. The captured image is selected if the at least one common feature is identified in both the captured image and the viewer image.

29 Claims, 10 Drawing Sheets

(56) References Cited

U.S. PATENT DOCUMENTS

2011/0050954 A1    3/2011    Prentice
2011/0096149 A1*    4/2011    Au et al. .......................... 348/47
2012/0054311 A1*    3/2012    Mizuno et al. ................ 709/218
2012/0170847 A1*    7/2012    Tsukidate ..................... 382/190

FOREIGN PATENT DOCUMENTS

| | | |
|---|---|---|
| JP | 2010-169954 A | 8/2010 |
| JP | 2011-090158 A | 5/2011 |
| WO | WO2010/038112 A1 | 4/2010 |
| WO | WO2011/028231 A1 | 3/2011 |

\* cited by examiner

METHOD, SYSTEM AND APPARATUS FOR SELECTING AN IMAGE CAPTURED ON AN IMAGE CAPTURE DEVICE

REFERENCE TO RELATED PATENT APPLICATION(S)

This application claims the benefit under 35 U.S.C. §119 of the filing date of Australian Patent Application No. 2011253977, filed 12 Dec. 2011, hereby incorporated by reference in its entirety as if fully set forth herein.

FIELD OF INVENTION

The present invention relates to image capture devices such as digital cameras and, in particular, to timely sharing of an image with a recipient who appears in the image and has seen the image. The present invention also relates to a method, system and apparatus for selecting an image captured on an image capture device. The present invention also relates to a computer program product including a computer readable medium having recorded thereon a computer program for selecting an image captured on an image capture device.

DESCRIPTION OF BACKGROUND ART

Digital cameras enjoy widespread use today. Such devices use one or more sensors to capture light from a scene and convert the light to a digital image, commonly as JPEG or RAW format files, which can later be transferred to other devices. Many modern digital cameras allow captured images to be displayed on the device such that the photographer can review, show, edit or delete images without needing to develop film. This functionality is typically available after an image is captured and typically a photographer is able to view a captured image within less than one second after it is captured.

Modern digital camera technology is found in numerous portable devices including compact cameras, video camcorders, digital single-lens reflex (DSLR) cameras, mobile camera-phones, tablet computers, laptops and handheld videogame consoles. The portable nature and convenience of such devices allows a user to frequently carry some form of digital camera with them. Therefore there has been a notable increase in the number of images being captured. Additionally, the success of social networks and online photo-sharing services indicate that users enjoy having electronic access to images captured by their friends, especially if both parties co-attended the same event together.

In particular, one common social behavior between two parties—a photographer and a friend—is for the photographer to capture an image of the friend and subsequently show the friend the image using review functionality of the camera. It is often these images that the friend explicitly asks to be sent a copy of. One problem for the photographer in such a scenario is the lack of convenient functionality to pass the image to the friend. Typically the photographer would first return home, transfer images from the camera to a computer, and then transmit the digital files to the interested recipient via (for example) the Internet. However, such a method of sharing images takes place some considerable time after the moment of capture and review—and in some cases the photographer forgets to share the images—such that the friend does not receive their desired images for a long time.

A photographer with an online-enabled camera can address the above problem. For instance, the photographer can upload desired images to their public gallery where the friend can later view the uploaded images. However, this approach involves uploading the images to a public or semi-public location and does not fully preserve privacy.

Alternatively, the photographer can use their online-enabled camera to directly transmit the images to the recipient via an Internet service (e.g. email, social networks), a proximity protocol (e.g. infrared sensors, Bluetooth), or some other telecommunication services (e.g. MMS, or "smartphone" apps such as Bump™ by Bump Technologies and Dropbox™ by Dropbox Inc.). However, such methods require a user to manually input contact information about a recipient and this unnecessary labor is compounded if multiple friends wish to obtain the images.

One method of sharing images scans a disk for images, detects faces, recognises faces based on their digital facial signatures, and sends images to the recognised people. Drawbacks of such a method include the need for considerable amounts of training data (digital signatures) for identification. Further, an image may be sent to everyone identified rather than only users who ask for a copy.

SUMMARY OF THE INVENTION

It is an object of the present invention to substantially overcome, or at least ameliorate, one or more disadvantages of existing arrangements.

According to one aspect of the present disclosure there is provided a method of selecting an image captured on an image capture device, said method comprising:

displaying a captured image on a display associated with the image capture device;

capturing, using the image capture device, a viewer image of a viewer viewing the captured image displayed on the display;

comparing the captured image and the viewer image to identify at least one common feature in the captured image and the viewer image; and selecting the captured image if the at least one common feature is identified in both the captured image and the viewer image.

According to another aspect of the present disclosure there is provided an apparatus for selecting an image captured on an image capture device, said apparatus comprising:

means for displaying a captured image on a display associated with the image capture device;

means for capturing, using the image capture device, a viewer image of a viewer viewing the captured image displayed on the display;

means for comparing the captured image and the viewer image to identify at least one common feature in the captured image and the viewer image; and means for selecting the captured image if the at least one common feature is identified in both the captured image and the viewer image.

According to still another aspect of the present disclosure there is provided a system for selecting an image captured on an image capture device, said system comprising:

a memory for storing data and a computer program;

a processor coupled to said memory for executing said computer program, said computer program comprising instructions for:

displaying a captured image on a display associated with the image capture device;

capturing, using the image capture device, a viewer image of a viewer viewing the captured image displayed on the display;

comparing the captured image and the viewer image to identify at least one common feature in the captured image and the viewer image; and selecting the captured image if the at least one common feature is identified in both the captured image and the viewer image.

According to still another aspect of the present disclosure there is provided a computer readable medium having a computer program stored thereon for selecting an image captured on an image capture device, said program comprising:

code for displaying a captured image on a display associated with the image capture device;

code for capturing, using the image capture device, a viewer image of a viewer viewing the captured image displayed on the display;

code for comparing the captured image and the viewer image to identify at least one common feature in the captured image and the viewer image; and code for selecting the captured image if the at least one common feature is identified in both the captured image and the viewer image.

Other aspects of the invention are also disclosed.

BRIEF DESCRIPTION OF THE DRAWINGS

One or more embodiments of the invention will now be described with reference to the following drawings, in which.

DETAILED DESCRIPTION OF EMBODIMENTS OF THE INVENTION

Figure 1A:
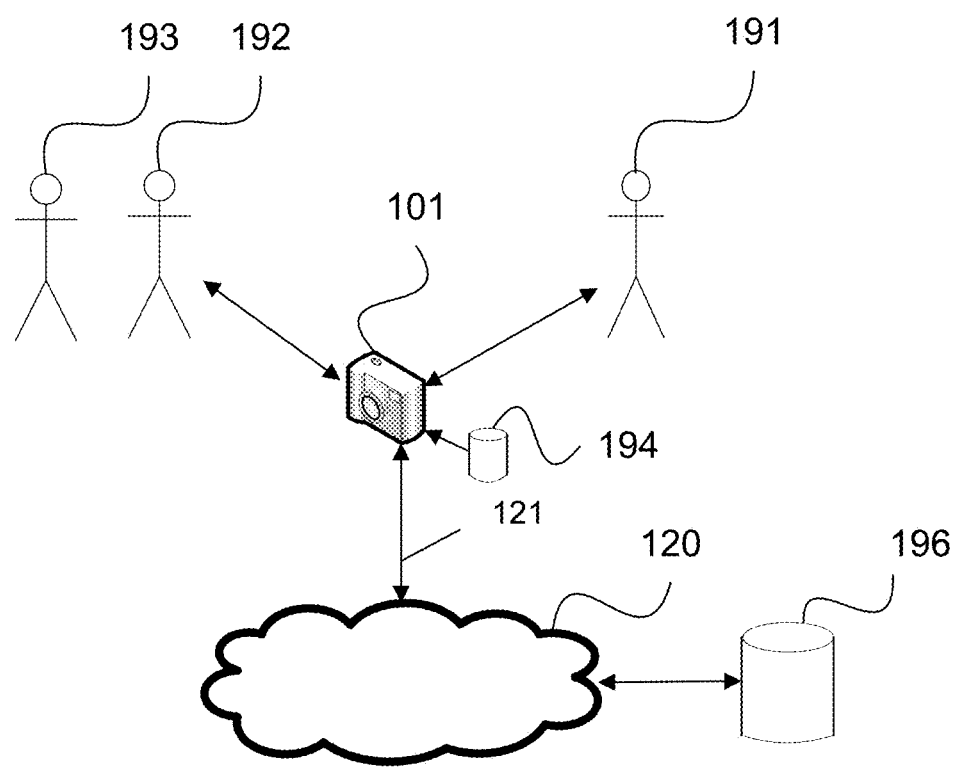
FIG. 1A shows a system for capturing and selecting an image, including an image capture device.

Where reference is made in any one or more of the accompanying drawings to steps and/or features, which have the same reference numerals, those steps and/or features have for the purposes of this description the same function(s) or operation(s), unless the contrary intention appears.

A method 200 (see FIG. 2) of selecting an image captured on an image capture device, such as a camera 101 (see FIG. 1A), will be described below. The method 200 may be used for sharing images, especially digital photos, with interested parties who have seen the images on a display and have a strong association with the images.

In accordance with the method 200, viewers of images are monitored while the images are being displayed. The method 200 also determines if the viewers are strongly associated with the images. Upon a successful match between a viewer and image content, contact details for the viewer are determined and the image may be electronically transmitted according to the contact details.

Sharing an image typically comprises providing access to the image to one or more interested parties (or recipients). The act of sharing generally refers to providing a copy, especially a digital copy of the image or access to a digital copy. A user typically shares a digital image by sending the recipient a file or hyperlink via a communication service. Examples of suitable communications services include Internet services (e.g. email, blogs, file hosting, social networks, TCP/UDP channels, etc.) or device-device communication technologies (e.g. Bluetooth™, infrared, WiFi, 2G, 3G, 4G, GSM, USB, Ethernet, etc.).

A photographer often physically shares (i.e. by displaying on the camera) an image with a subject if the image includes the subject. Often the subject then requests a copy of the image. The method 200 assists the photographer by automatically detecting the identity of the viewer and determining the contact details of the viewer. In particular, not every viewer of an image wishes to obtain a copy of every image. Therefore, the method 200 determines if there is a significantly strong association between the viewer and the image, such as if the viewer happens to be in the image. Upon successfully determining such an association, the image is selected for further processing and potential transmission. The further processing may comprise updating image metadata, obtaining communication details of the viewer, and transmitting images to the viewer. The method 200 therefore allows, for instance, a photographer to electronically share photos with co-present friends by letting the friends view the images on a display of the camera 101.

Figure 1B:
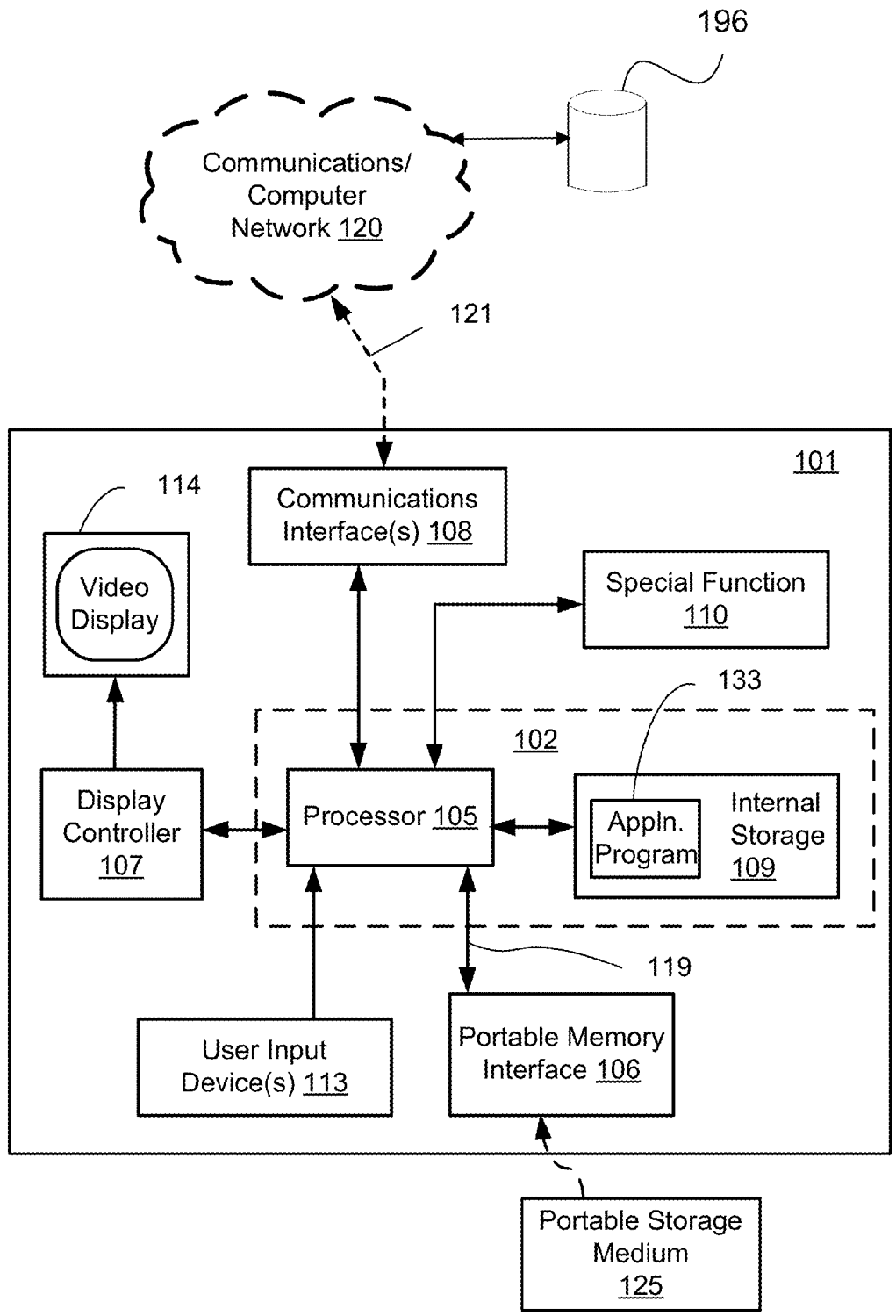
FIGS. 1B and 1C collectively form a schematic block diagram representation of the image capture device of FIG. 1A.
Figure 1C:
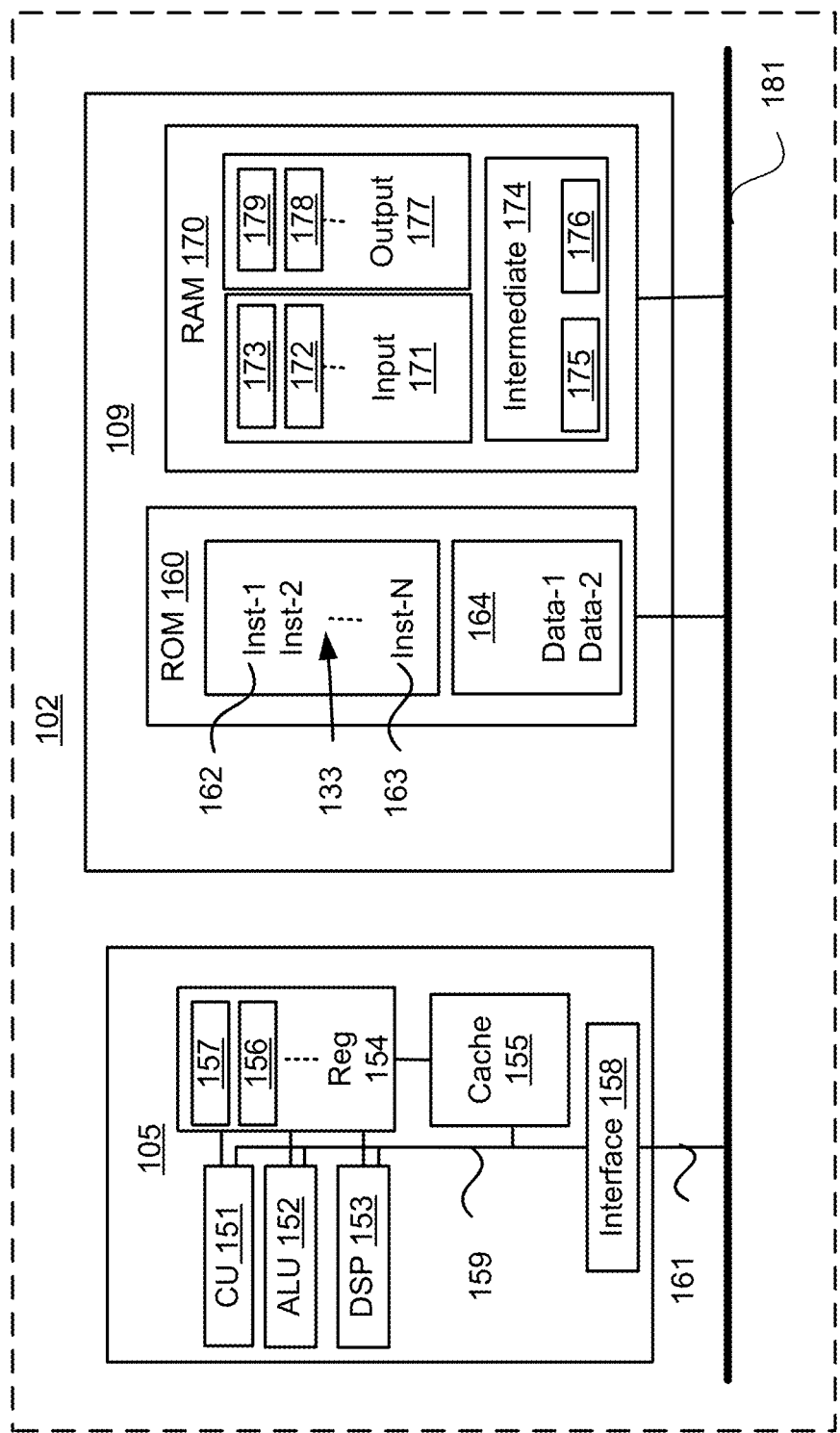

FIGS. 1B and 1C collectively form a schematic block diagram of an image capture device in the form of the camera 101 including embedded components, upon which the method 200 to be described is desirably practiced. The camera 101 is a mobile camera-phone. Alternatively, the camera 101 may be in the form of a video camcorder, digital single-lens reflex (DSLR) camera, compact digital camera, or the like. Further, the camera 101 may be integrated within a surface computing device, a tablet computer, a laptop, a computer terminal, a handheld videogame console or the like. Still further, the method 200 to be described may also be performed on higher-level devices such as desktop computers, server computers, and other such devices with significantly larger processing resources.

As seen in FIG. 1B, the camera 101 comprises an embedded controller 102. Accordingly, the camera 101 may be referred to as an "embedded device." In the present example, the controller 102 has a processing unit (or processor) 105 which is bi-directionally coupled to an internal storage module 109. The storage module 109 may be formed from non-volatile semiconductor read only memory (ROM) 160 and semiconductor random access memory (RAM) 170, as seen in FIG. 1C. The RAM 170 may be volatile, non-volatile or a combination of volatile and non-volatile memory.

The camera 101 includes a display controller 107, which is connected to a video display 114, such as a liquid crystal display (LCD) panel or the like. The display controller 107 is configured for displaying graphical images on the video display 114 in accordance with instructions received from the embedded controller 102, to which the display controller 107 is connected.

The camera 101 also includes user input devices 113 which are typically formed by keys, a keypad or like controls. In some implementations, the user input devices 113 may include a touch sensitive panel physically associated with the display 114 to collectively form a touch-screen. Such a touch-screen may thus operate as one form of graphical user interface (GUI) as opposed to a prompt or menu driven GUI typically used with keypad-display combinations. Other forms of user input devices may also be used, such as a microphone (not illustrated) for voice commands or a joystick/thumb wheel (not illustrated) for ease of navigation about menus.

As seen in FIG. 1B, the camera 101 also comprises a portable memory interface 106, which is coupled to the processor 105 via a connection 119. The portable memory interface 106 allows a complementary portable memory device 125 to be coupled to the camera 101 to act as a source or destination of data or to supplement the internal storage module 109. Examples of such interfaces permit coupling with portable memory devices such as Universal Serial Bus (USB) memory devices, Secure Digital (SD) cards, CompactFlash (CF) cards, Personal Computer Memory Card International Association (PCMIA) cards, flash memory, optical disks and magnetic disks.

The camera 101 also has a communications interface 108 to permit coupling of the camera 101 to a computer or communications network 120 via a connection 121. The connection 121 may be wired or wireless. For example, the connection 121 may be radio frequency or optical. An example of a wired connection includes Ethernet. Further, an example of wireless connection includes Bluetooth™ type local interconnection, Wi-Fi (including protocols based on the standards of the IEEE 802.11 family), Infrared Data Association (IrDa) and the like.

The embedded controller 102, possibly in conjunction with further special function components 110, is provided to perform functions of the camera 101. The components 110 may represent a lens, focus control and image sensor of the camera 101. The special function component 110 is connected to the embedded controller 102. As another example, the camera 101 may be in the form of a mobile telephone handset. In this instance, the components 110 may comprise those components required for communications in a cellular telephone environment. Where the camera 101 is a portable device, the special function components 110 may also comprise a number of encoders and decoders of a type including Joint Photographic Experts Group (JPEG), (Moving Picture Experts Group) MPEG, MPEG-1 Audio Layer 3 (MP3), and the like.

The methods described hereinafter may be implemented using the embedded controller 102, where the processes of FIGS. 2 to 6 may be implemented as one or more software application programs 133 executable within the embedded controller 102. The camera 101 of FIG. 1B implements the described methods. In particular, with reference to FIG. 1C, the steps of the described methods are effected by instructions in the software 133 that are carried out within the controller 102. The software instructions may be formed as one or more code modules, each for performing one or more particular tasks. The software may also be divided into two separate parts, in which a first part and the corresponding code modules performs the described methods and a second part and the corresponding code modules manage a user interface between the first part and the user.

The software 133 of the embedded controller 102 is typically stored in the non-volatile ROM 160 of the internal storage module 109. The software 133 stored in the ROM 160 can be updated when required from a computer readable medium. The software 133 can be loaded into and executed by the processor 105. In some instances, the processor 105 may execute software instructions that are located in RAM 170. Software instructions may be loaded into the RAM 170 by the processor 105 initiating a copy of one or more code modules from ROM 160 into RAM 170. Alternatively, the software instructions of one or more code modules may be pre-installed in a non-volatile region of RAM 170 by a manufacturer. After one or more code modules have been located in RAM 170, the processor 105 may execute software instructions of the one or more code modules.

The application program 133 is typically pre-installed and stored in the ROM 160 by a manufacturer, prior to distribution of the camera 101. However, in some instances, the application program 133 may be supplied to the user encoded on one or more CD-ROM (not shown) and read via the portable memory interface 106 of FIG. 1B prior to storage in the internal storage module 109 or in the portable memory 125. In another alternative, the software application program 133 may be read by the processor 105 from the network 120, or loaded into the controller 102 or the portable storage medium 125 from other computer readable media. Computer readable storage media refers to any non-transitory tangible storage medium that participates in providing instructions and/or data to the controller 102 for execution and/or processing. Examples of such storage media include floppy disks, magnetic tape, CD-ROM, a hard disk drive, a ROM or integrated circuit, USB memory, a magneto-optical disk, flash memory, or a computer readable card such as a PCMCIA card and the like, whether or not such devices are internal or external of the camera 101. Examples of transitory or non-tangible computer readable transmission media that may also participate in the provision of software, application programs, instructions and/or data to the camera 101 include radio or infra-red transmission channels as well as a network connection to another computer or networked device, and the Internet or Intranets including e-mail transmissions and information recorded on Websites and the like. A computer readable medium having such software or computer program recorded on it is a computer program product.

The second part of the application program 133 and the corresponding code modules mentioned above may be executed to implement one or more graphical user interfaces (GUIs) to be rendered or otherwise represented upon the display 114 of FIG. 1B. Through manipulation of the user input device 113 (e.g., the keypad), a user of the camera 101 and the application program 133 may manipulate the interface in a functionally adaptable manner to provide controlling commands and/or input to the applications associated with the GUI(s). Other forms of functionally adaptable user interfaces may also be implemented, such as an audio interface utilizing speech prompts output via loudspeakers (not illustrated) and user voice commands input via the microphone (not illustrated).

FIG. 1C illustrates in detail the embedded controller 102 having the processor 105 for executing the application program 133 and the internal storage 109. The internal storage 109 comprises read only memory (ROM) 160 and random access memory (RAM) 170. The processor 105 is able to execute the application program 133 stored in one or both of the connected memories 160 and 170. When the camera 101 is initially powered up, a system program resident in the ROM 160 is executed. The application program 133 permanently stored in the ROM 160 is sometimes referred to as "firmware". Execution of the firmware by the processor 105 may fulfil various functions, including processor management, memory management, device management, storage management and user interface.

The processor 105 typically includes a number of functional modules including a control unit (CU) 151, an arithmetic logic unit (ALU) 152 and a local or internal memory comprising a set of registers 154 which typically contain atomic data elements 156, 157, along with internal buffer or cache memory 155. One or more internal buses 159 interconnect these functional modules. The processor 105 typically also has one or more interfaces 158 for communicating with external devices via system bus 181, using a connection 161.

The application program 133 includes a sequence of instructions 162 though 163 that may include conditional branch and loop instructions. The program 133 may also include data, which is used in execution of the program 133. This data may be stored as part of the instruction or in a separate location 164 within the ROM 160 or RAM 170.

In general, the processor 105 is given a set of instructions, which are executed therein. This set of instructions may be organised into blocks, which perform specific tasks or handle specific events that occur in the camera 101. Typically, the application program 133 waits for events and subsequently executes the block of code associated with that event. Events may be triggered in response to input from a user, via the user input devices 113 of FIG. 1A, as detected by the processor 105. Events may also be triggered in response to other sensors and interfaces in the camera 101.

The execution of a set of the instructions may require numeric variables to be read and modified. Such numeric variables are stored in the RAM 170. The disclosed method uses input variables 171 that are stored in known locations 172, 173 in the memory 170. The input variables 171 are processed to produce output variables 177 that are stored in known locations 178, 179 in the memory 170. Intermediate variables 174 may be stored in additional memory locations in locations 175, 176 of the memory 170. Alternatively, some intermediate variables may only exist in the registers 154 of the processor 105.

The execution of a sequence of instructions is achieved in the processor 105 by repeated application of a fetch-execute cycle. The control unit 151 of the processor 105 maintains a register called the program counter, which contains the address in ROM 160 or RAM 170 of the next instruction to be executed. At the start of the fetch execute cycle, the contents of the memory address indexed by the program counter is loaded into the control unit 151. The instruction thus loaded controls the subsequent operation of the processor 105, causing for example, data to be loaded from ROM memory 160 into processor registers 154, the contents of a register to be arithmetically combined with the contents of another register, the contents of a register to be written to the location stored in another register and so on. At the end of the fetch execute cycle the program counter is updated to point to the next instruction in the system program code. Depending on the instruction just executed this may involve incrementing the address contained in the program counter or loading the program counter with a new address in order to achieve a branch operation.

Each step or sub-process in the processes of the methods described below is associated with one or more segments of the application program 133, and is performed by repeated execution of a fetch-execute cycle in the processor 105 or similar programmatic operation of other independent processor blocks in the camera 101.

In one arrangement, the camera 101 displays one image in "review" mode while capturing a separate image of one or more viewers of the display 114. The method 200 subsequently compares the images to algorithmically determine if the images share at least one common feature. However, there are multiple alternative arrangements of the camera 101 and the method 200.

As seen in FIG. 1A, a user 191 uses the camera 101 capable of displaying images. Viewers 192 and 193 are potentially able to view the display 114 of the camera 101. For the purposes of identifying the viewers 192 and 193 and obtaining communication details (contact details) in order to transmit images, the camera 101 may comprise a local database 194 containing viewer details configured, for example, within the storage module 109. Alternatively, the viewer details may be obtained using the processor 105, via the communications network, 120 from an external data source 196 connected to the network 120, such as from a social network.

Figure 2:
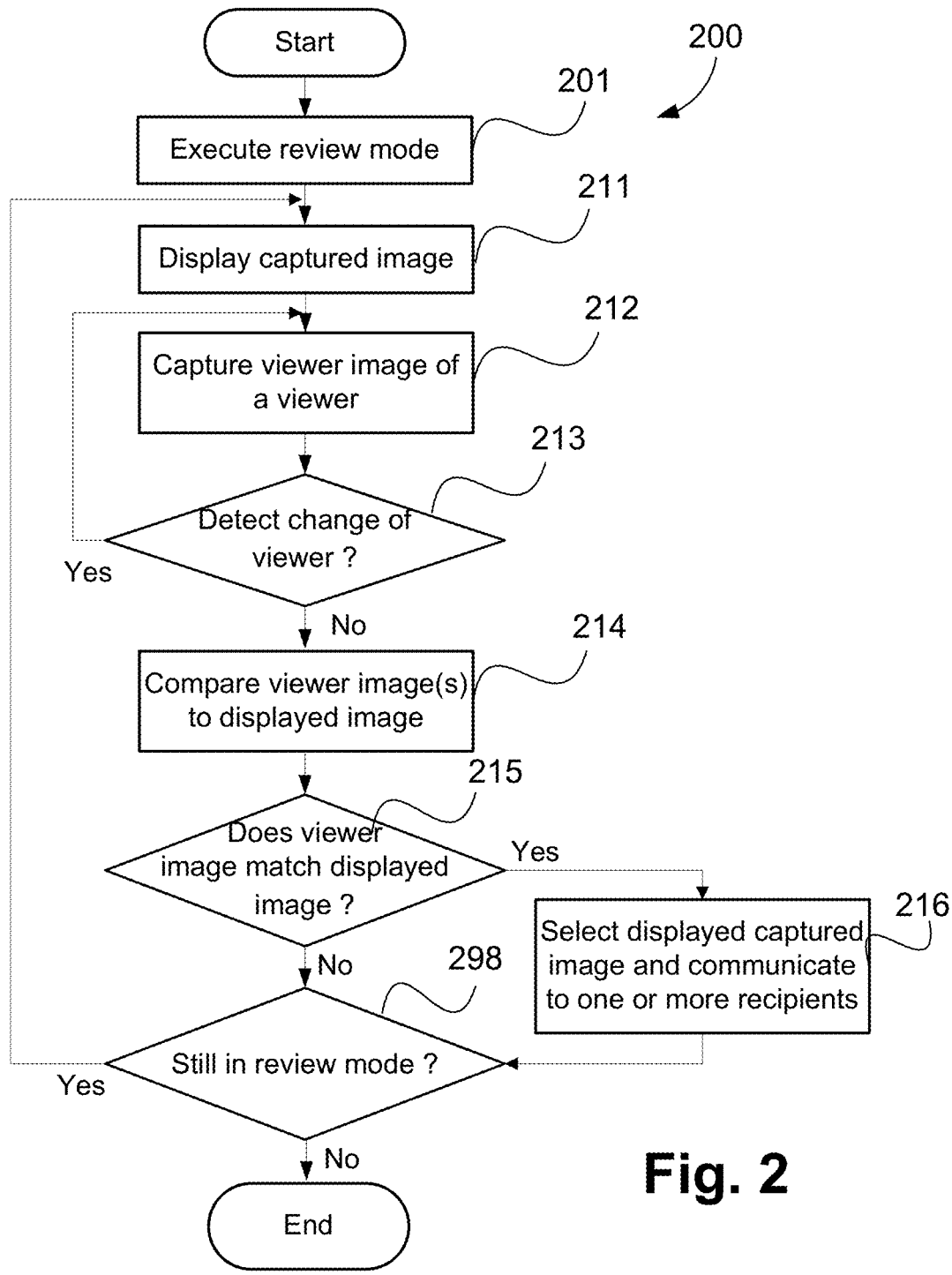
FIG. 2 is a schematic flow diagram showing a method of selecting an image.
Figure 3A:
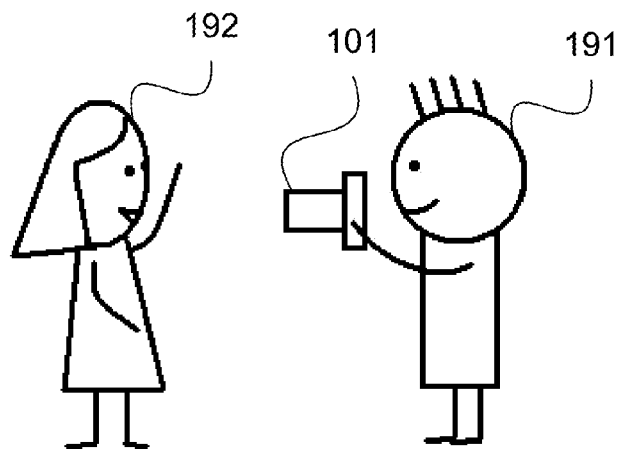
FIG. 3A shows the photographer of FIG. 1A capturing an image of a friend using the camera of FIG. 1A.
Figure 3B:
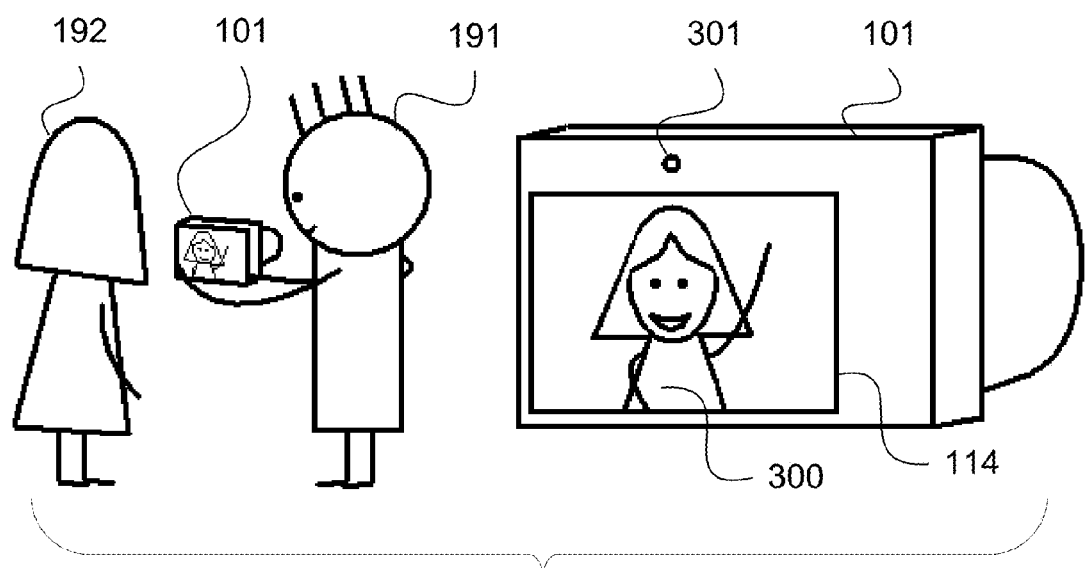
FIG. 3B shows the friend of FIG. 3A viewing the captured image on a display of the camera of FIG. 1A.
Figure 3C:
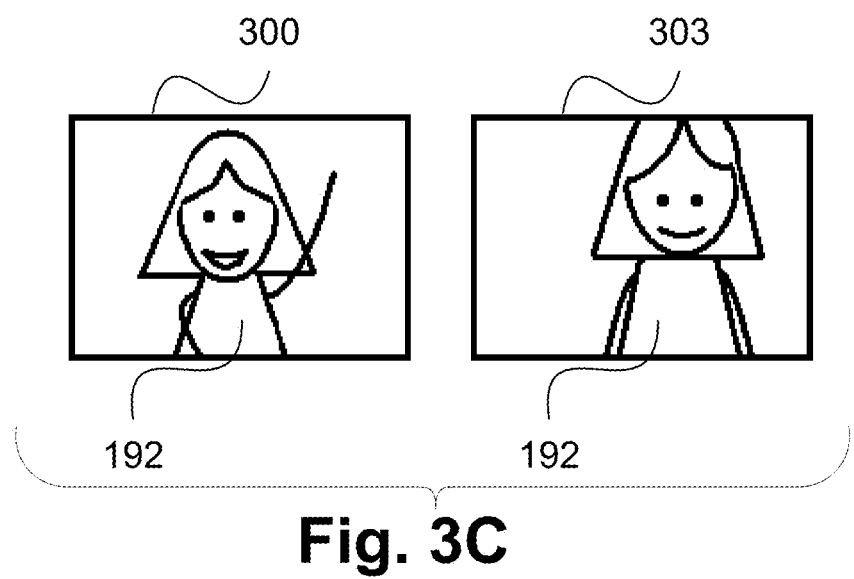
FIG. 3C shows an example of a captured image and a viewer image.

With reference to FIG. 2, the method 200 will be described by way of example where an image captured by the photographer 191 using the camera 101, referred to as the "captured image", is being reviewed. The captured image is compared to an image of the viewer 192, referred to as "viewer image". As an example, FIG. 3C shows a captured image 300 and a viewer image 303 that may be compared. FIG. 3A shows the photographer 191 capturing the image 300 using the camera 101. The comparison determines if the viewer 192 is strongly associated with the captured image 300. In some arrangements, especially those relating to digital photography, the comparison may be in relation to determining if the viewer 192 is looking at an image 300 of themselves. There may be multiple people (e.g., the viewer 192 and 193) captured in the captured image 300 such that the viewer 192 is still identified to have a strong association with the captured image 300.

In some arrangements, a common feature used to determine if the viewer 192 is strongly associated with the captured image 300 may be that of viewer ownership. For example, if the captured image 300 is of a dog or house owned by the viewer 192, then there still exists a strong association between the viewer 192 and the captured image 300.

The method 200 may be implemented as one or more software code modules of the software application program 133 resident within the storage module 109 and being controlled in its execution by the processor 105.

The method 200 begins at review mode step 201, where the processor 105 is used to execute a "review mode" using the display 114, where one or more images, including the captured image 300, may be displayed on the display 114 for review. As an example, the photographer 190 may switch the camera 101 to review mode using the input device 113.

At display step 211, the processor 105 is used for displaying the captured image 300, and one or more other images stored in the storage module 109, on the display 114 associated with the camera 101, one image at a time. For example, FIG. 3B shows the viewer 192 viewing the image 300 displayed on the display 114 of the camera 101. In one arrangement, multiple images may be displayed on the display 114 at a time.

As the viewer 192 is viewing the display 114, at capture step 212, the processor 105 is used for capturing an image 303 of the viewer 192 (i.e., the "viewer image") viewing the captured image 300 displayed on the display 114. The viewer image 303 may be stored within the storage module 109 using the processor 105. The viewer image 303 may be significantly compact in terms of resolution and colour since quality of the viewer image 303 is not critical.

In one arrangement, the camera 101 comprises a small user-facing camera component 301, as seen in FIG. 3B, which may be configured for capturing the viewer image 303 as the viewer 192 is viewing the image 300 displayed on the display 114. Such a user-facing component 301 may alternatively be integrated within the surface computing device, the tablet computer, the laptop, the computer terminal, the handheld videogame console or the like, as described above. In another arrangement, the display 114 and camera used to capture the viewer image 303 may be separate hardware components. For example, the viewer image 303 may be captured at step 212 using a webcam connected to the network 120. Such a webcam may, for example, capture an image of the viewer 192 during a video phone call.

Figure 4A:
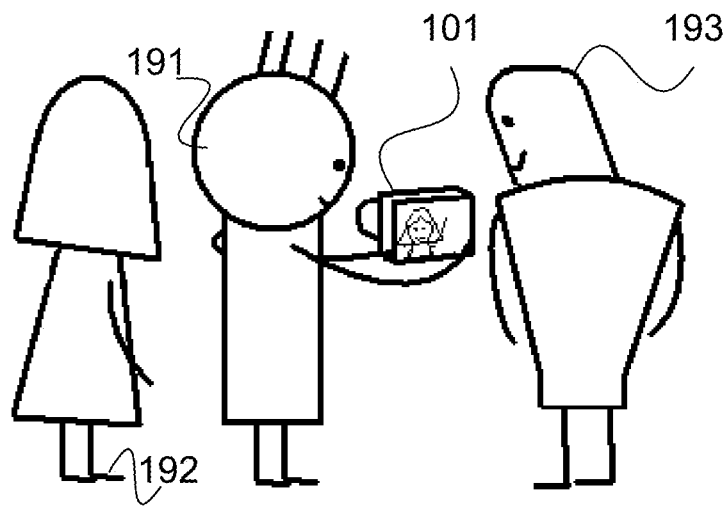
FIG. 4A shows an example where a further viewer is shown the display of the camera of FIG. 1A.
Figure 4B:
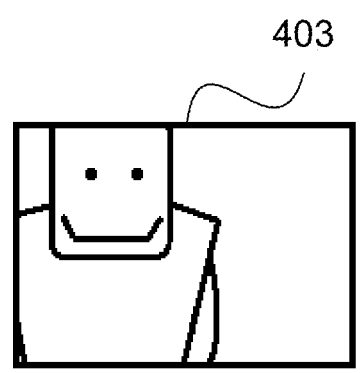
FIG. 4B shows a further viewer image captured by the camera of FIG. 1A.

Additionally, in some arrangements the capture step 212 may be initiated by a user input, such as a designated button, gesture, voice command, or the like. However, in other arrangements the capture step 212 is performed passively such that one or more viewer images 303 are automatically captured when a viewer 192 is near the display 114. At detection step 213, the processor 105 is used for detecting if a change of viewer occurs, such as the second viewer 193 approaching the camera 101. If the processor 105 detects a change of viewer at step 213, then the method 200 returns to step 212. In this instance, at step 212, the processor 105 is used for capturing additional viewer images showing, for example, the further viewer 193. Otherwise, the method 200 proceeds to step 214. For example, FIG. 4A shows an example where the further viewer 193 appears and is also shown the display 114 of the camera 101. In accordance with the example of FIG. 4A, a viewer image 403 depicting the further viewer 193, as shown in FIG. 4B, is captured at step 212. In one arrangement, the user-facing camera component 301 may be used to capture the viewer image 403 as the viewer 193 is viewing the image 300 displayed on the display 114. In another arrangement, the viewer image 403 may be captured using a webcam or the like connected to the network 120.

In accordance with the present example, once at least one image (e.g., the viewer image 303) of at least the viewer 192 is captured, at comparison step 214, the processor 105 is used for comparing the image(s) (e.g., the captured image 300) being displayed on the display 114 and the viewer image 303 to identify at least one common feature in both the captured image and the viewer image 303. In accordance with one example, in the event that the viewer image 403 has been captured, the processor 105 may also be used to perform a comparison between the viewer image 403 and image(s) being displayed on the display 114, including the captured image 300.

At matching step 215, if the processor 105 determines that there is a match between the viewer image 303 and the displayed captured image 300 (e.g., at least one common feature has been identified in the viewer image 303 and the captured image 300 at step 214), or any of the other images displayed on the display 114 at step 211, then the method 200 proceeds to selecting step 216. Otherwise, the method 200 proceeds to step 298. In accordance with some arrangements, step 215 may impose additional conditions to be satisfied along with the matching of the viewer image 303 and the displayed captured image 300. For example, an additional condition is that the captured image 300 is displayed or viewed for a minimum time interval. The minimum time interval may be configured to be long enough to ensure that a viewer, such as the viewer 192, is actively looking at the captured image 300 and not merely flicking through images. The minimum time interval may also be configured to be long enough to ensure that the viewer 192 has time to react to changes in the display 114. As such, the processor 105 may be configured to determine if the captured image has been viewed for the minimum time interval before the method 200 proceeds to step 216.

In a second example, an additional condition is that a positive or negative emotional response is detected in a viewer, such as the viewer 192. A typical positive response may be a smile, detectable using either the viewer image 303 or the user-facing camera component 301. Another example of a positive response is laughter, detectable by a user input component 113 such as a microphone. Once any additional conditions are satisfied and a match is confirmed at step 215, the method 200 proceeds to step 216. As such, the processor 105 may be configured for detecting the positive or negative emotional response from the viewer 192 before the method 200 proceeds to step 216. In this instance, as described below, the displayed captured image may be transmitted following such a positive emotional response being detected from the viewer 192.

At selecting step 216, the processor 105 is used for selecting the displayed captured image 300, displayed on the display 114, and communicating the captured image 300 to one or more recipients. A method 600 of communicating the selected image 300 to one or more recipients, as executed at step 216, will be described in detail below with reference to FIG. 6. As described above, the captured image 300 is selected if at least one common feature is identified in both the captured image 300 and the viewer image 303.

At decision step 298, the processor 105 is used to determine if the camera 101 is still in review mode. If the camera 101 is still in review mode, then the method 200 returns to steps 211 and 212 and the camera 101 waits for either a new viewer image to be captured or the display 114 to change to display a new image. Otherwise, the method 200 concludes.

In accordance with the example of FIG. 3B, the viewer image 303 captured using the camera component 301 is compared to the image 300 at step 214. In one arrangement, at comparison step 214, the processor 105 is used to determine visual similarity of facial features in the captured image 300 (and other images) displayed on the display 114 and the viewer image 303. Accordingly, the common feature identified in the viewer image 303 and the captured image 300 may be a human face. Face detection methods may be used to determine regions of the displayed image 300 and viewer image 303 perceived to be of a face. Any face detection method suitable for implementing with still images or video frames may be used at step 214. Facial regions determined using such face detection methods may then be compared to each other for visual similarity using, depending on hardware limitations, one or a combination of similarity metrics such as mean squares, cross-correlation, ratio image uniformity, pattern intensity, mutual information or the like. If similarity determined between the facial regions of the images 300 and 303, exceeds a predetermined threshold, for example, then facial regions are determined to be equal. Such face detection and comparison methods do not require a face to be positively identified.

As another example, at comparison step 214, the processor 105 may be used to determine similarity between other body parts or features displayed within the images 300 and 303, such as a distinctive hairstyle, presence of clothing apparel such as a hat or umbrella, or wearable patterns such as a personal identifier (e.g., name-tag), a barcode and/or a t-shirt design, shown in the captured image (and other images) displayed on the display 114 and the viewer image.

For the example captured image 300 and the viewer image 303, key common features between both images 300 and 303 may be likeness of the viewer 192 in the images 300 and 303, particularly the face and clothing of the viewer 192. For example, the common feature identified in the captured image 300 and the viewer image 303 may be one or more of shape, material, texture or colour of a dress or clothing apparel being worn by the viewer 192. In this instance, if similarity between the common features of the images 300 and 303 exceeds a predefined minimum threshold at step 214, then the image 300 is selected for communication at step 216.

In one arrangement, a database of features associated with known viewers, may be used at step 214. For example, the database of features may be configured within the storage module 109 together with the local database containing viewer details. Alternatively, such a database of features may be obtained using the processor 105, via the communications network 120, from an external data source 196 connected to the network 120. In this instance, the processor 105 may determine if the viewer image 303 and displayed captured image 300 contain common features in the form of objects that belong to the viewer 192, such as a pet, car or house.

Additionally, in some arrangements, the aforementioned criteria, including facial recognition, similarity of other body parts or features and/or similarity of objects that belong to the viewer 192, may be used in combination to determine similarity between the captured image 300 (and other images) displayed on the display 114 and the viewer image 303. A combination of such criteria provides additional support and strengthens confidence of the determination of a match between the displayed captured image 300 and the viewer image 303.

Figure 6:
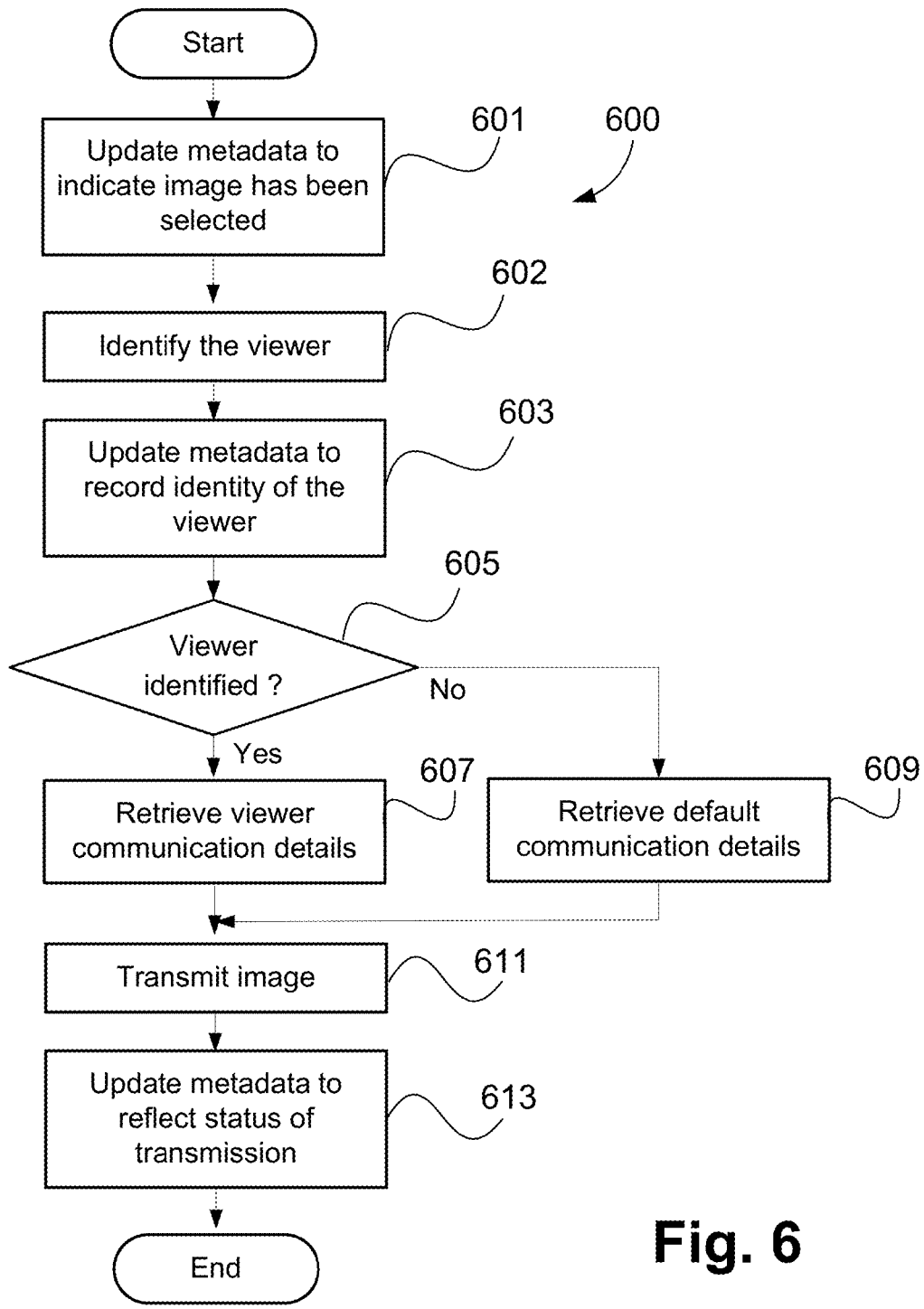
FIG. 6 is a schematic flow diagram showing a method of communicating a selected image to one or more recipients.

The method 600 of communicating the selected image 300 to one or more recipients, as executed at step 216, will now be described with reference to FIG. 6. The method 600 may implemented as one or more code modules of the software application program 133, resident in the storage module 109, and being controlled in its execution by the processor 105. Alternatively, the method 600 may be performed using external means, such as on a personal computer (PC) connected to the network 120. In one arrangement, the method 600 may be performed on a remote server or the like (e.g., executing a cloud computing service), where computational resources are more abundant.

The method 600 begins at step 601, where the processor 105 is used for updating the image metadata associated with the selected image 300 to indicate that the image 300 has been selected. The metadata may be in the form of EXIF, ICMP, XMP or alternative formats and once updated the metadata may be stored with the selected image 300 within the storage module 109.

At identification step 602, the processor 105 is used to identify the viewer 192. In one arrangement, the viewer 192 may be identified by performing facial recognition on one or both the viewer image 303 and the selected image 300. Any face recognition method suitable for implementing with still images or video frames may be used at step 602, in a similar manner to step 214 above.

Then at updating step 603, metadata associated with the selected image 300 is updated to indicate the identity of the viewer 192. The metadata updated at step 603 may be stored with the selected image 300 within the storage module 109.

At decision step 605, the processor 205 is used to determine if the viewer 192 has been identified. If the viewer 192 has been identified, then the method 600 proceeds to step 607. Otherwise, the method 600 proceeds to step 609. In one arrangement, the method 600 may conclude following step 605, if the viewer 192 is not identified, and step 298 of the method 200 is performed as seen in FIG. 2.

At step 607, the processor 105 is used for retrieving communication details for the viewer 192 identified at step 602.

The communication details may be in the form of a destination address or resource where the selected image 300 should be communicated. The destination address may be an email address for an email account, a social network identifier, a telephone number, a postal address, a social security number, a username, a nickname, a blog address, a web address, or various similar identifiers that are associated with the viewer 192. In one arrangement, communication details for one or more other recipients, such as the photographer 191 and/or further viewers 193, may also be retrieved at step 607.

In one arrangement, the destination address or resource retrieved at step 607 may be associated with and accessible to the viewer 192 but not belong exclusively to the viewer 192. For example, the address or resource may identify an online public photo gallery.

As described above, the communication details may be retrieved at step 607 based on the identity of the viewer 192 as determined at step 602. For example, a metadata tag may be determined at step 602. In this instance, at step 607, the processor 105 may be used to match the metadata tag determined at step 602 to a metadata tag stored in the local database 194 of communication details configured within the storage module 109. Alternatively, such a database of communication details may be configured within a remote database (e.g., within the data source 196) accessed via the network 120.

The data source 196 may be associated with a social networking site or the like. In this instance, the processor 105 may be used to access one or more social networking pages associated with the viewer 192 (e.g., using the metadata tag) to retrieve the communication details of the viewer 192.

As described above, if the viewer 192 is not identified at step 605, then in some arrangements the method 600 may proceed to step 609. At step 609, the processor 105 is used to retrieve default communication details. For example, a default destination address or resource may be retrieved at step 609 for the communication of the selected image 300. For example, the default destination address may be the address of a personal blog or social network gallery associated with the photographer 191 where the viewers 192 and 193 may access the images online.

At communication step 611, the processor 105 is used to communicate the selected image 300 to the viewer 192 based on the communication details retrieved at step 607 or at step 609. For example, the selected image 300 may be transmitted via the network 120 to a remote email server connected to the network 120, based on an email address retrieved at step 606. In one arrangement, the selected image 300 may be transmitted at step 611 to a plurality of recipients including, for example, the photographer 191, the viewer 192, and/or further viewers 193. In this instance, as well as retrieving the communication details for the viewer 192 at step 607, the communication details for the photographer 191 and/or any further viewers 193 may also be retrieved.

Prior to transmission, the selected image 300 may be queued for transmission, for example, within the storage module 109.

In one arrangement, the processor 105 may be used for flagging the selected image 300 for pending transmission at step 611 rather than transmitting the image immediately. The selected image 300 may be flagged in such a manner for example, if the camera 101 lacks access to the communication network 120 at the time that the selected image 300 is selected at step 216. In one arrangement, the selected image 300 may be flagged in such a manner if a resource cost associated with transmitting the image over the network 120 may be more expensive than a different network that is temporarily out of range. In one arrangement, the selected image 300 may be flagged in such a manner if the user prefers to explicitly confirm which data is sent from the camera 101 and at what time it is transmitted.

At updating step 613, the processor 105 is used to update the metadata associated with the selected image 300 to reflect status of the transmission. The metadata updated at step 613 may be stored with the selected image 300 within the storage module 109.

In addition to the selected image 300, the processor 105 may be used at step 216 for selecting additional images, associated with the selected image 300, for transmission. For example, images that were contemporaneously captured to the first selected image 300 may also be of interest to the viewer 192 and may be bundled together with the first selected image 300. In one arrangement, such additional selected images may depict a common feature (e.g., facial or other body part feature, object belonging to the viewer 300) that resulted in a successful match at step 214 of the first selected image 300 with the viewer image 303, although such a common feature is not necessary once at least the image 300 has been successfully selected. One of the additional selected images may be transmitted to one or more recipients if the additional selected image has at least one common feature with the viewer image 303. If such additional images are selected, then at step 601, the processor 105 may be used for updating metadata associated with the additional images.

Figure 4C:
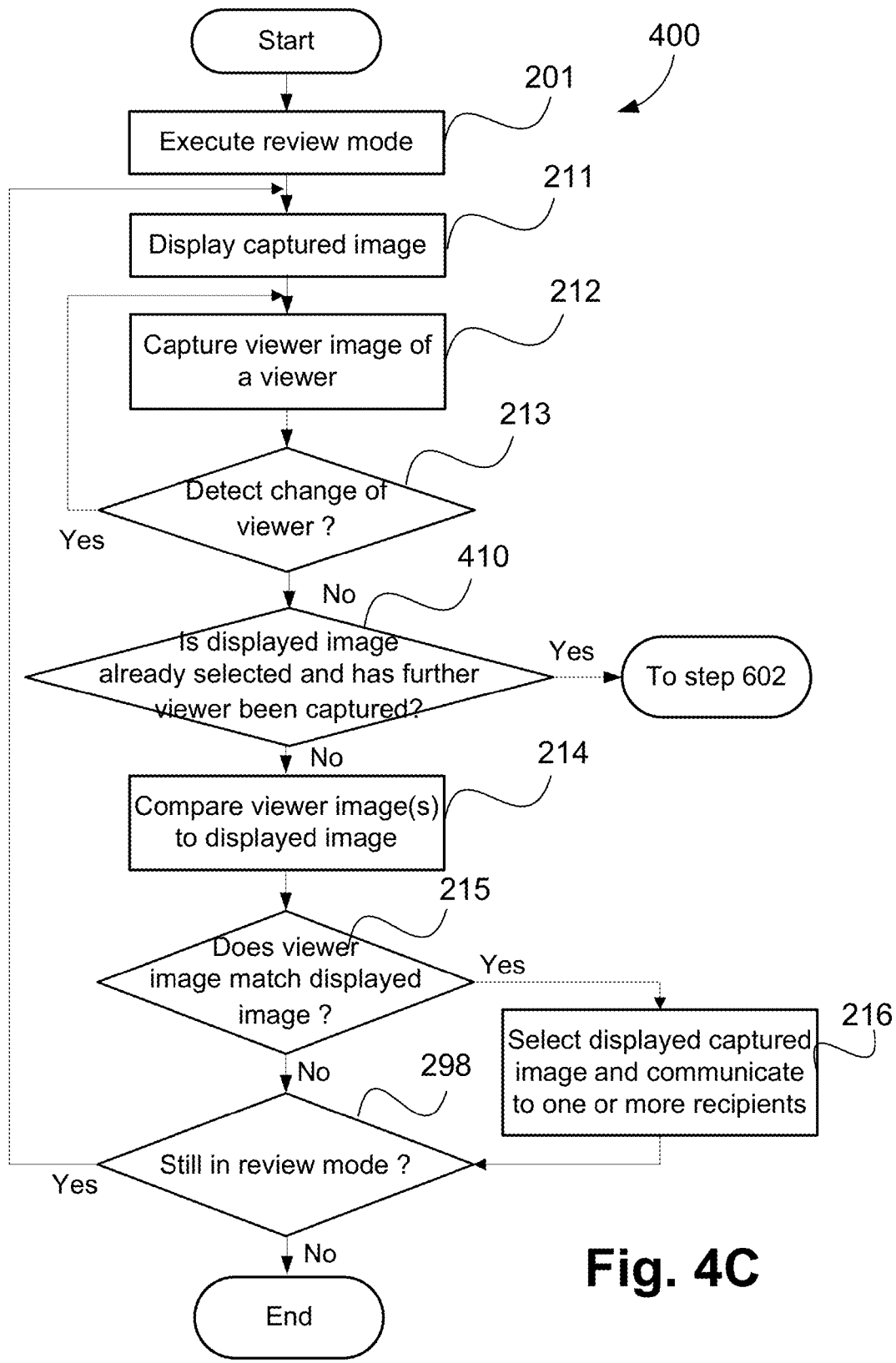
FIG. 4C is a schematic flow diagram of another method of selecting an image.

FIG. 4C shows another method 400 of selecting an image. The method 400 may be implemented as one or more code modules of the software application program 133 resident on the hard disk drive and being controlled in its execution by the processor 105. The method 400 supports transmission of the captured image 300 to recipients other than the viewer 192, such as a further viewer 193.

The method 400 is similar to the method 200 and includes steps 201 and 211, 212 and 213, 214, 215, 216 and 298. However, at step 410, the processor 105 is used to determine if the displayed image 300 is already selected and if a further viewer image (e.g., the viewer image 403) has been captured. If the displayed image 300 is already selected and if a further viewer image has been captured, then the method 400 bypasses the comparison steps 214 and proceeds directly to step 602 to identify the further viewer 193 and obtain communication details for the further viewer 193. In this instance, at step 602, the processor 105 is used to identify the further viewer 193 by, for example, performing facial recognition on the further viewer image 403. Then at updating step 603, the processor 105 is used to update the metadata associated with the selected image 300 in order to indicate the identity of the further viewer 193. Again, the metadata may be stored with the selected image 300 within the storage module 109.

Then at decision step 605, the processor 105 is used to determine if the further viewer 193 has been identified. If the viewer 193 has been identified, then the method 600 proceeds to step 607, where the communication details of the further viewer 193 are retrieved. Then at step 611, the processor 105 is used to communicate the selected image 300 to the viewer 193 based on the communication details retrieved at step 607, as well as communicating the selected image 300 to the viewer 192 as described above. The method 600 allows an already-selected image 300 to be transmitted to other recipients who may not normally match the displayed image 300.

If the displayed image 300 is not already selected at step 410, then the method 400 proceeds to step 214 which is executed as described above.

In further arrangements, the viewer order may be reversed such that the further viewer 193 sees the image 300 on the display 114 first and subsequently fails to match the image 300 at step 214. The first viewer 192 may then view the image 300 on the display 114 and be successfully matched with the image 300 at step 214. As long as the viewer image 403 of the further viewer 193 is temporarily stored in memory (e.g., within RAM 170), further arrangements may be used to transmit data to both viewers 192 and 193, and to one or more other recipients.

Figure 5:
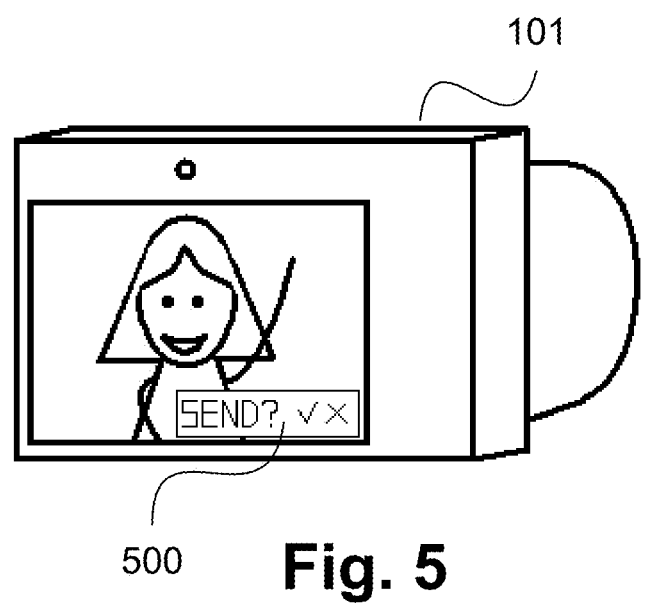
FIG. 5 shows a prompt displayed on a display of the camera of FIG. 1A to prompt the photographer to confirm if transmission should be performed.

FIG. 5 shows a prompt 500 that may be displayed on the display 114 in accordance with some arrangements. The prompt may be used for prompting the photographer 191 confirm or adjust transmission parameters associated with communicating the image 300, for example, at step 611. For example, the prompt 500 may display text asking the photographer 191 for confirmation or permission to transmit data (e.g., the image 300) from the camera 101. The photographer 191 may use the prompt 500 to optionally adjust the transmission parameters of the recipient(s) before the image(s) (e.g., 300) are transmitted.

INDUSTRIAL APPLICABILITY

The arrangements described are applicable to the computer and data processing industries and particularly for the image processing.

The foregoing describes only some embodiments of the present invention, and modifications and/or changes can be made thereto without departing from the scope and spirit of the invention, the embodiments being illustrative and not restrictive.

In the context of this specification, the word "comprising" means "including principally but not necessarily solely" or "having" or "including", and not "consisting only of". Variations of the word "comprising", such as "comprise" and "comprises" have correspondingly varied meanings.

The claims defining the invention are as follows:

1. A method of selecting an image captured on a portable image capture device having a forward facing camera component and a backward facing camera component, said method comprising:
   capturing an image using the forward facing camera component of the portable image capture device;
   displaying the captured image on a display of the portable image capture device;
   capturing, using the backward facing camera component of the portable image capture device, a viewer image of at least the viewer viewing the display displaying the displayed image;
   comparing at least one region of the displayed image and the viewer image to identify at least one common feature in the displayed image and the viewer image; and
   selecting the displayed image for communication to at least the viewer according to the communication details of the viewer, if the at least one common feature is identified in both the displayed image and the viewer image.

2. The method according to claim 1, wherein the at least one common feature is a human face.

3. The method according to claim 1, wherein the common feature is a personal identifier.

4. The method according to claim 1, wherein the common feature is one or more of shape, material, texture or colour of a dress or clothing apparel of the viewer.

5. The method according to claim 1, further comprising updating metadata associated with the selected image.

6. The method according to claim 1, further comprising determining if the displayed image has been viewed for a minimum time interval before the displayed image is selected.

7. The method according to claim 1, further comprising detecting a positive or negative emotional response from the viewer before the displayed image is selected.

8. The method according to claim 1, further comprising retrieving said communication details for the viewer using the identity of the viewer determined from the viewer image.

9. The method according to claim 1, further comprising flagging the selected image for pending transmission.

10. The method according to claim 1, further comprising prompting a user to confirm and/or adjust transmission parameters associated with communicating the selected image to one or more recipients.

11. The method according to claim 1, further comprising detecting a change of viewer.

12. The method according to claim 1, further comprising capturing an image of a further viewer.

13. The method according to claim 1, wherein the image capture device is a digital camera.

14. The method according to claim 1, wherein the image capture device is a camera-phone.

15. The method according to claim 1, wherein the image capture device is a surface computing device.

16. The method according to claim 1, wherein the image capture device is a computer terminal comprising a user-facing camera configured for capturing images of the viewer.

17. The method according to claim 1, where the display and camera are separate hardware components.

18. The method according to claim 1, wherein the communication details are retrieved from a social network using the identity of the viewer determined from the viewer image.

19. The method according to claim 1, further comprising transmitting the selected image to one or more recipients.

20. The method according to claim 19, wherein the selected image is transmitted following a positive emotional response being detected from the viewer.

21. The method according to claim 19, wherein the communication details are retrieved from a social network.

22. The method according to claim 1, further comprising selecting additional images associated with the selected image.

23. The method according to claim 22, further comprising updating metadata associated with the additional images.

24. The method according to claim 22, further comprising transmitting one or more of the additional selected images to one or more recipients.

25. The method according to claim 22, wherein one of the additional selected images is transmitted to one or more recipients if the additional selected image has at least one common feature with the viewer image.

26. Apparatus for selecting an image captured on a portable image capture device having a forward facing camera component and a backward facing camera component, said apparatus comprising:
   means for capturing an image using the forward facing camera component of the portable image capture device;
   means for displaying the captured image on a display of the portable image capture device;
   means for capturing, using the backward facing camera component of the portable image capture device, a viewer image of at least the viewer viewing the display displaying the displayed image;
   means for comparing at least one region of the displayed image and the viewer image to identify at least one common feature in the displayed image and the viewer image; and
   means for selecting the displayed image for communication to at least the viewer according to the communication details of the viewer, if the at least one common feature is identified in both the displayed image and the viewer image.

27. A system for selecting an image captured on a portable image capture device having a forward facing camera component and a backward facing camera component, said system comprising:
   a memory for storing data and a computer program;
   a processor coupled to said memory for executing said computer program, said computer program comprising instructions for:
      capturing an image using the forward facing camera component of the portable image capture device;
      displaying the captured image on a display of the portable image capture device;
      capturing, using the backward facing camera component of the portable image capture device, a viewer image of at least the viewer viewing the display displaying the displayed image;
      comparing at least one region of the displayed image and the viewer image to identify at least one common feature in the displayed image and the viewer image; and
      selecting the displayed image for communicating to at least the viewer according to the communication details of the viewer, if the at least one common feature is identified in both the displayed image and the viewer image.

28. A non-transitory computer readable medium having a computer program stored thereon for selecting an image captured on a portable image capture device having a forward facing camera component and a backward facing camera component, said program comprising:
   code for capturing an image using the forward facing camera component of the portable image capture device;
   code for displaying the captured image on a display of the portable image capture device;
   code for capturing, using the backward facing camera component of the portable image capture device, a viewer image of at least the viewer viewing the display displaying the displayed image;
   code for comparing at least one region of the displayed image and the viewer image to identify at least one common feature in the displayed image and the viewer image; and
   code for selecting the displayed image for communication to at least the viewer according to the communication details of the viewer, if the at least one common feature is identified in both the displayed image and the viewer image.

29. A method of selecting an image captured on an image capture device having at least two lens components integral with the image capture device, said method comprising:
   capturing an image on an image capture device using a first lens component of the image capture device, the image capture device being adapted to operate in a capture mode to capture images to be displayed on a display of the image capture device, in a review mode to display the images captured in the capture mode on the display of the image capture device, and in a viewer image capture mode to capture at least one image of a viewer using a second lens component while the viewer is reviewing the displayed image;

displaying the captured image on the display of the image capture device if the image capture device is in the review mode;

capturing, using the second lens component of the image capture device being in the viewer image capture mode, an image of a viewer viewing the display displaying the displayed image, in response to detecting the viewer;

comparing at least one region of the displayed image and the viewer image to identify at least one common feature in the displayed image and the viewer image; and selecting the displayed image for communication to at least the viewer according to communication details of the viewer, if the common feature is identified in both the displayed image and the viewer image, wherein the communication details of the viewer are retrieved from a database using the identity of the viewer detected based on the viewer image.

\* \* \* \* \*